United States Patent [19]

Besecke et al.

[11] Patent Number: 5,286,801

[45] Date of Patent: Feb. 15, 1994

[54] EMULSION GRAFT COPOLYMERS

[75] Inventors: Siegmund Besecke, Hameln; Daniel Wagner, Bad Durkheim; Wilfried Schoen, Ingelheim; Karl-Ludwig Endlich, Mainz, all of Fed. Rep. of Germany

[73] Assignee: BASF Aktiengesellschaft, Ludwigshafen, Fed. Rep. of Germany

[21] Appl. No.: 876,780

[22] Filed: Apr. 30, 1992

[30] Foreign Application Priority Data

May 4, 1991 [DE] Fed. Rep. of Germany ....... 4114641

[51] Int. Cl.$^5$ .................. C08F 265/06; C08F 285/00
[52] U.S. Cl. .................... 525/307; 525/309; 525/80; 525/85
[58] Field of Search ................ 525/307, 309

[56] References Cited

U.S. PATENT DOCUMENTS

| | | | |
|---|---|---|---|
| 3,793,402 | 2/1974 | Owens . | |
| 3,853,968 | 12/1974 | Bortnick et al. | 525/307 |
| 4,097,553 | 6/1978 | Novak | 525/307 |
| 4,180,529 | 12/1979 | Hofman . | |
| 4,433,103 | 2/1984 | Kamata et al. . | |
| 4,513,118 | 4/1985 | Suetterlin et al. | 525/304 |

FOREIGN PATENT DOCUMENTS 0095769 12/1983 European Pat. Off. .

OTHER PUBLICATIONS

Chemical Abstracts, vol. 102, No. 16, Apr. 1985, Abs No. 132950u.

*Primary Examiner*—Vasu S. Jagannathan
*Attorney, Agent, or Firm*—Keil & Weinkauf

[57] ABSTRACT

Emulsion graft copolymers composed of
a) 2–10% by weight of a core composed of
  80–99.99% by weight of methyl methacrylate (I),
  0.01–5% by weight of allyl methacrylate (II),
  0–19.99% by weight of other monofunctional comonomers (III) and
  0–3% by weight of other di- or polyfunctional comonomers (IV),
b) 15–50% by weight of a first shell composed of
  60–89.99% by weight of a $C_1$–$C_{20}$-alkyl acrylate (V),
  10–39.99% by weight of a vinylaromatic monomer (VI),
  0.01–5% by weight of II,
  0–10% by weight of I and/or III,
  0–3% by weight of IV,
c) 5–20% by weight of a second shell with a composition as indicated under (a),
d) 15–50% by weight of a third shell with a composition as indicated under (b),
e) 15–30% by weight of a fourth shell composed of
  80–99.95% by weight of I,
  0.05–2% by weight of a regulator (VII) and
  0–19.95% by weight of III, are suitable as additives to increase the impact strength of thermoplastic compositions.

1 Claim, No Drawings

EMULSION GRAFT COPOLYMERS

The present invention relates to emulsion graft copolymers composed of a) 2–10% by weight of a core composed of
   80–99.99% by weight of methyl methacrylate (I),
   0.01–5 % by weight of allyl methacrylate (II),
   0–19.99% by weight of other monofunctional comonomers (III) and
   0–3% by weight of other di- or polyfunctional comonomers (IV),
b) 15–50% by weight of a first shell composed of
   60–89.99% by weight of a $C_1$–$C_{20}$-alkyl acrylate (V),
   10–39.99% by weight of a vinylaromatic monomer (VI),
   0.01–5 % by weight of II,
   0–10% by weight of I and/or III,
   0–3% by weight of IV,
c) 5–20% by weight of a second shell with a composition as indicated under (a),
d) 15–50% by weight of a third shell with a composition as indicated under (b),
e) 15–30% by weight of a fourth shell composed of
   80–99.95% by weight of I,
   0.05–2% by weight of a regulator (VII) and
   0–19.95% by weight of III,
with the proviso that the total of the contents of the shells (b) and (d) is 50–75% by weight.

The present invention also relates to a process for preparing these emulsion graft copolymers and to the use thereof as additives for increasing the impact strength of thermoplastic compositions.

The present invention also relates to moldings and flat materials composed of these thermoplastic compositions.

Emulsion graft copolymers based on vinyl monomers are generally known and are used on their own but especially as additives in synthetics such as acrylate- and methacrylate-based homo- and copolymers. Adding them improves the impact strength of such polyacrylate resins which can be processed, for example, to give moldings, sheets, films and organic glasses (acrylic glass). The other important basic properties of polyacrylate resins, such as high transmission of light and clarity, resistance to weathering, heat resistance and mechanical strength may, however, be impaired by these additions. This is why it is generally attempted, using emulsion graft copolymers with a multishell structure and specific composition, to minimize the unwanted changes in the properties or, where possible, not allow them to happen and, at the same time, to increase the impact strength.

DE-A 22 53 689 discloses multistage emulsion graft copolymers. The polymers described in detail therein have a three-stage structure, i.e. a core and first and second grafted shells, where the core and second shell are composed of a hard, non-elastomeric polymer and the first shell is composed of an elastomeric polymer. This DE-A also refers to the possibility of multistage construction of the graft copolymers from alternate hard and elastomeric phases (column 13, 2nd paragraph). Specifically described are five-stage graft copolymers (Examples 15 and 17) with a core content of about 20% by weight. Monomers mentioned for the core and the hard shells are, inter alia, methyl methacrylate, α-methylstyrene, styrene and acrylonitrile, and for the elastomeric shells predominantly butadiene and butyl acrylate. It is furthermore possible for both the core and the hard and elastomer shells to be composed of polyfunctional crosslinkers such as allyl methacrylate, diallyl maleate, alkylene glycol dimethacrylates and diacrylates, divinylbenzene or trivinylbenzene.

These polymers are used as additives to thermoplastics such as, mainly, polyacrylate resins in order to increase their impact strength. Even when this purpose is satisfactorily achieved, it is frequently at the expense of impairing other important mechanical, thermal and optical properties, e.g. the tensile strength, the heat resistance and the transmission of light.

It is an object of the present invention to find emulsion graft copolymers as impact modifiers for thermoplastic compositions which confer on these compositions a high impact strength without at the same time substantially impairing the other properties.

We have found that this object is achieved by the polymers defined in the first paragraph.

We have also found a process for preparing them, the use thereof as additives to increase the impact strength of thermoplastic compositions, and moldings and flat materials composed of these thermoplastic compositions.

The emulsion graft copolymers according to the invention are constructed in five stages from a hard, non-elastomeric core (a), an elastomeric first shell (b), a hard, non-elastomeric second shell (c), an elastomeric third shell (d) and finally an outer, hard, non-elastomeric fourth shell (e), the individual stages being present in the following amounts:

2–10% by weight, preferably 2–6% by weight, of core (a),
15–50% by weight, preferably 20–45% by weight, of first shell (b),
5–20% by weight, preferably 5–15% by weight, of second shell (c),
15–50% by weight, preferably 20–45% by weight, of third shell (d) and
15–30% by weight, preferably 15–25% by weight, of fourth shell (e),
with the proviso that the total of the contents of shells (b) and (d) is 50–75% by weight, preferably 60–75% by weight.

The percentages in each case are based on the total weight of the five-stage graft copolymer.

The hard core (a) of the emulsion graft copolymer is composed of
80–99.99% by weight, preferably 90–98.99% by weight, of methyl methacrylate (I),
0.01–5% by weight of allyl methacrylate (II),
0–19.99% by weight, preferably 1–9.99% by weight, of other monofunctional comonomers (III) and
0–3% by weight of other di- or polyfunctional comonomers (IV).

Suitable monofunctional comonomers (III) are $C_1$–$C_{20}$-alkyl and $C_5$–$C_{12}$-cycloalkyl acrylates, $C_2$–$C_{20}$-alkyl and $C_5$–$C_{12}$-cycloalkyl methacrylates, acrylonitrile and methacrylonitrile, acrylamide and methacrylamide and their N-alkyl and dialkyl derivatives with $C_1$–$C_{20}$-alkyl groups, vinyl esters of aliphatic $C_2$–$C_8$-carboxylic acids, such as vinyl acetate, vinylaromatic compounds such as styrene, α-methylstyrene and vinyltoluene, vinyl halides such as vinyl chloride and vinylidene chloride, and mixtures of these monomers.

Preferred comonomers (III) are $C_1$–$C_8$-alkyl acrylates, especially ethyl acrylate, which are preferably present in an amount of 1-6% by weight in the polymer of the core.

Comonomers (III) mainly serve to improve the thermal stability of the graft copolymers.

Suitable di- or polyfunctional comonomers (IV) are alkylene glycol diacrylates such as ethylene glycol diacrylate, propylene glycol diacrylate, 1,3-butylene glycol diacrylate and 1,4-butylene glycol diacrylate, alkylene glycol dimethacrylates such as ethylene glycol dimethacrylate, propylene glycol dimethacrylate, 1,3-butylene glycol dimethacrylate and 1,4-butylene glycol dimethacrylate, acrylates and methacrylates of glycerol, trimethylolpropane, pentaerythritol, inositol and similar sugar alcohols, acrylamides and methacrylamides of ethylenediamine and other aliphatic diamines and polyamines, triacrylamides and trimethacrylamides, trialyl cyanurate and triallyl isocyanurate and vinylbenzenes such as divinylbenzene and trivinylbenzene.

Comonomers (IV) act as crosslinkers. Because of their property of being uniformly incorporated into the polymeric phase they are also called polymerization crosslinkers. During the polymerization the rate of their consumption is essentially comparable with that of the main monomer, which results in crosslinking within the phase.

Comonomers (IV) can form up to 3% by weight of the core polymer, but they are preferably used in amounts of only 0.1-0.5% by weight, if at all.

In contrast to this, the use of a second type of crosslinker, which is also called graft crosslinker, is essential.

Allyl methacrylate (II) is present as grafting comonomer to the extent of 0.01-5% by weight in the core composition, the amount depending on the required core size. At a preferred core size of 40-140 nm, the allyl methacrylate content is 0.1-0.5% by weight.

Grafting comonomers ensure external crosslinking and bring about in the construction of an emulsion graft copolymer for example the linkage of the core phase to the subsequent polymerization stage. Graft crosslinkers such as allyl methacrylate behave in this way because a polymerizable double bond (in the acid moiety) polymerizes at a comparable rate to that of the main monomer (methyl methacrylate). By contrast, the allyl double bond reacts at a distinctly lower rate so that, at the end of the polymerization, some of these double bonds remain unchanged in the core phase, which allows graft crosslinking between two phases.

The core material has a glass transition temperature above 50° C., preferably in the range from 80° to 130° C.

The second polymerization stage comprises polymerization in the presence of the core emulsion polymer, also called core latex or seed latex, of a monomer mixture composed of
60–89.99% by weight, preferably 70–89.99% by weight, of a $C_1$–$C_{20}$-alkyl acrylate (V),
10–39.99% by weight, preferably 10–29.99% by weight, of a vinylaromatic monomer (VI),
0.01–5% by weight, preferably 0.1–5% by weight, of II,
0–10% by weight of I and/or III and
0–3% by weight of IV
which forms the first elastomeric shell (b) of the five-stage emulsion graft copolymer.

Preferred $C_1$–$C_{20}$-alkyl acrylates (V) are the $C_2$–$C_{10}$-alkyl esters, and butyl acrylate and 2-ethylhexyl acrylate are particularly preferred.

Suitable vinylaromatic monomers (VI) are styrene, α-methylstyrene, t-butylstyrene, monochloro-styrene, vinyltoluene and phenyl acrylate and methacrylate.

The vinylaromatic monomers (VI), especially styrene, are particularly important because they increase the refractive index. It is possible in this way to make it equal to that of the core phase and of the subsequent polymer phases. In addition, the refractive index can also be harmonized with that of the thermoplastic composition by means of the vinylaromatic monomers in the five-stage emulsion polymer.

Furthermore, the polymeric material of the first shell contains 0.01–5% by weight, preferably 0.1–5% by weight, of the graft crosslinker allyl methacrylate (II). Even addition of this alone results in a high impact strength of the five-stage final product so that it is not absolutely necessary also to use other di- or polyfunctional comonomers (IV) acting as polymerization crosslinkers. They can contribute 0–3% of the total weight of the monomers in the first shell.

The content of monofunctional comonomers (I) and (III) can be 0–10% by weight, it being limited so that the glass transition temperature in the elastomeric first shell does not exceed 0° C. Also suitable as III are vinylcarbazole, $C_1$–$C_{10}$-alkyl maleates, fumarates and itaconates, maleamide, fumaramide and itaconamide and their N-alkyl and dialkyl derivatives with $C_1$–$C_{10}$-alkyl groups.

Highly polar monofunctional comonomers (III) such as acrylic and methacrylic acids, acrylamides and methacrylamides, hydroxyalkyl esters and aminoalkyl esters of acrylic and methacrylic acids with up to 8 carbons are polymerized into the first shell (b) preferably only in small amounts, if at all.

The third polymerization stage comprises polymerization, in the presence of the core and first shell lattices which have already been formed, of a monomer mixture to give a hard second shell (c) which comprises 5–20%, preferably 5–15%, of the total weight of the five-stage emulsion graft copolymer. The composition of the monomer mixture is as stated for the core material (a) but does not have to be identical to the latter. The glass transition temperature of the second shell (c) is above 50° C., preferably from 80° to 130° C.

The fourth polymerization stage comprises polymerization, in the presence of the three previously polymerized phases, of a monomer mixture to give an elastomeric third shell (d). In accordance with the elastomeric first shell (b) it comprises 15–50%, preferably 20–45%, of the total weight of the graft copolymer, with the proviso that the total of the elastomeric shells (b) and (d) is 50–75%, preferably 60–75% by weight. The total amount of the two shells can be equally distributed between the individual elastomeric polymer phases.

The composition of the monomer mixture used corresponds to that of shell (b) but does not have to be identical to it.

The elastomeric second shell (d) has a glass transition temperature below 0° C., preferbly in the range from −5° to −35° C.

The fifth polymerization stage comprises polymerization, in the presence of the core and shell lattices already formed, of a monomer mixture to give an outer hard fourth shell (e). This shell, also called the outer hard phase, comprises 15–30%, preferably 15–25%, of the total weight of the emulsion graft copolymer and is composed of
80–99.95% by weight preferably 90–98.95% by weight, of methyl methacrylate (I),
0.05–2% by weight, of a regulator (VII) and 0–19.95% by weight, preferably 1–9.95% by weight, of other monofunctional comonomers (III), and particularly preferred for III are $C_1$–$C_{20}$-alkyl acrylates, such as ethyl acrylate, in an amount of 1–6% by weight. As in the hard phases formed previously, the core (a) and second shell (c), addition thereof improves the thermal stability.

Suitable regulators (VII) are primary alkyl mercaptans such as sec-butyl mercaptan, n-dodecyl mercaptan and t-dodecyl mercaptan, and n-dodecyl mercaptan is particularly suitable.

The presence of a regulator is particularly important because it limits the chain length on polymerization of the final phase. It is possible in this way to adapt the molecular weight of the outer hard phase to that of the thermoplastic composition, which is particularly advantageous when mixing the emulsion graft copolymers with thermoplastic compositions.

The glass transition temperature of the outer shell (a) is above 50° C., preferably from 80° to 130° C.

The emulsion graft copolymers according to the invention can be prepared in conventional ways by the methods of emulsion graft copolymerization, which are also called seed latex processes, in five consecutive stages in which the latex particles remain in the emulsified state until completion of the final stage.

The total content of particles in the five-stage final product is fixed by the polymeric product in the seed latex. This means that essentially no new particles are formed after the first polymerization stage, and the particle content remains approximately constant.

It is possible by use of emulsifiers to fix the particle size both of the core latex and of the latex particles in the intermediate stages, the determining factors being the type and concentration of the emulsifier.

It is possible to use anionic and non-ionic emulsifiers.

Examples of suitable emulsifiers are dioctyl sodium sulfosuccinate, sodium lauryl sulfate, sodium dodecylbenzenesulfonate, alkylphenoxypolyethylenesulfonates and salts of long-chain carboxylic and sulfonic acids.

Examples of suitable non-ionic emulsifiers are fatty alcohol polyglycol ethers, alkylaryl polyglycol ethers, fatty acid monoethanolamides and ethoxylated fatty acid amides and amines.

The total amount of emulsifier is preferably 0.05–5% of the total weight of the emulsion graft copolymer.

The diameter of the finished emulsion polymer particles is adjusted in a conventional manner to 50–450 nm, preferably 150–300 nm.

Polymerization initiators which can be used are ammonium and alkali metal peroxodisulfates such as potassium peroxodisulfate, and initiator combination systems such as sodium persulfate/sodium hydrosulfite, potassium persulfate/sodium formaldehydesulfoxylate and potassium peroxodisulfate/sodium dithionite/iron(II) sulfate, where the polymerization is carried out at 50°–100° C. with the ammonium and alkali metal peroxodisulfates which require thermal activation, and at somewhat below this, for example at from 20° to 50° C., with redox initiator systems.

The total amount of initiator is preferably from 0.02 to 0.5% of the weight of the finished emulsion polymer.

Besides the molecular weight regulator which can be used in the polymerization of the outer hard shell (e), the polymerization of the core and other shells can likewise be carried out in the presence of a regulator. The total amount of regulator is from 0.01 to 1% of the total weight of the polymer.

It is advisable in general to keep the pH constant, for which reason the presence of a buffer is expedient, normally salts of phosphoric acid, e.g. mixtures of potassium dihydrogen phosphate and disodium hydrogen phosphate; it is also possible to use ammoniacal solutions.

The polymerization can be carried out at from 70° to 100° C., preferably from 85° to 95° C. The polymerization times increase below 70° C., and above 100° C. it is necessary to carry out the polymerization under pressure.

Otherwise, the emulsion graft copolymer according to the invention is prepared by introducing an aqueous mixture composed of monomers, crosslinker, emulsifer, initiator, regulator and a buffer system into a reactor under nitrogen, passing through nitrogen in the cold while stirring, and then heating at the polymerization temperature for about 15 to 120 minutes. This initial emulsification and polymerization of the core monomer mixture produces the core latex. The subsequent stages are in each case carried out by emulsion polymerization, introducing the monomers in the presence of the stage which has already formed, it being expedient to emulsify the monomers beforehand in the aqueous medium by stirring.

A subsequent stage is always introduced only when the polymerization in the preceding stage is complete, which prevents mixing of the individual stages and ensures a pure five-stage construction of the emulsion graft copolymer. This may make it necessary for reaction to be continued for 15–120 minutes after completing the introduction of one stage and before starting introduction of the next stage.

The emulsion polymerase is isolated from the resulting latex in a conventional manner by precipitation, filtration and subsequent drying. It is possible to use for the precipitation, for example, aqueous solutions of inorganic salts such as sodium chloride, sodium sulfate, magnesium sulfate and calcium chloride, aqueous solutions of salts of formic acid such as magnesium formate, calcium formate and zinc formate, aqueous solutions of inorganic acids such as sulfuric and phosphoric acid, and aqueous solutions of ammonia and amines, and other aqueous alkaline solutions, e.g. of sodium hydroxide and potassium hydroxide.

The drying can be carried out, for example, by freeze-drying, spray-drying and drying in a fluidized bed or circulating air oven.

The dried polymer can then be processed with polyacrylate resins in extruders to give impact-resistant thermoplastic compositions.

Coagulation of and removal of water from the latex can also be carried out directly in the extruder. The thermoplastic compositions can also be prepared by mixing the latex directly in the extruder with the base resin.

The emulsion polymers according to the invention can be processed not only by extrusion but also by other methods such as calendering and injection molding, either alone or mixed with polyacrylate resins, to give impact-resistant moldings, films and sheets. It is also possible to process together with other additives such as antioxidants, light stabilizers, thermal stabilizers, lubricants, dyes and fillers.

The emulsion graft compolymers according to the invention are preferably used as additives to improve the impact strength of thermoplastic compositions based on polyacrylate resins. Polyacrylate resins are essentially composed of methyl methacrylate and up to 50% by weight of other comonomers. These are mainly monofunctional monomers such as $C_1$-$C_8$-alkyl acrylates and $C_2$-$C_8$-alkyl methacrylates.

The thermoplastic compositions according to the invention contain 5-65% by weight of the emulsion graft copolymers according to the invention. In amounts of 15-65% by weight they improve the impact strength; in smaller amounts they improve the breaking strength in the production and demolding of injection moldings.

The novel five-stage emulsion graft copolymers have advantages over the prior art in that when they are added to thermoplastic compositions they increase the impact strength without adversely affecting the mechanical strength and thermal dimensional stability, while also having good melting characteristics. In terms of optical properties too, the polymers are distinguished by causing considerably less light scattering and by having a high transmission of light in thermoplastic compositions.

EXAMPLES

The following abbreviations are used in the examples:
MMA—methyl methacrylate
α-MeS—α-methylstyrene
EA—ethyl acrylate
n-BuA—n-butyl acrylate
ALMA—allyl methacrylate

EXAMPLES 1 TO 4

In each case a mixture of the components indicated in Tables 1 to 6 was introduced, in the amounts likewise evident therein, into a pressure reactor of capacity 800 l, nitrogen was passed through in the cold with stirring, and the mixture was then heated at 95° C. for 30 minutes. After the polymerization was complete, an emulsified second mixture (see Tables 1 to 6) was introduced into the reactor at 95° C. and under nitrogen. The subsequent introductions into the reactor were carried out in the same way after the polymerization. The individual introduction and polymerization times at 95° C. are shown in the tables.

The emulsion graft copolymers were precipitated from the lattices, isolated, washed and dried.

EXAMPLES 5 AND 6

In each case a mixture of the components indicated in Tables 5 and 6, was introduced in the amounts likewise evident therein, into a reactor vessel of capacity 10 l, nitrogen was passed through in the cold with stirring, and then the mixture was heated at 85°-95° C. for 180 and 80 minutes respectively. The subsequent polymerization and further processing were carried out as in Examples 1 to 4.

For the subsequent quality tests, test specimens were fabricated from granules prepared from 39% by weight of the emulsion graft copolymer and 61% by weight of a polyacrylate resin with an average molecular weight of 105,000 composed of 99% by weight of methyl methacrylate and 1% by weight of methyl acrylate.

The following properties were determined to test the quality of the blends:

impact strength by DIN 53 453 method
transmission of light by DIN 5036 method (6 mm)
cloudiness by the DIN 5036 method (6 mm)
elongation at break by the DIN 53 455 method
ultimate tensile strength by the DIN 53 455 method
tensile strength by the DIN 53 455 method
Vicat softening point by the DIN 53 460 method B/50
melting characteristics The impact strength was tested by the Charpy method. In this method, a standard test specimen resting on two supports is subjected to an impact aimed at its middle. The energy (kJ) required for destruction or damage is related to the critical cross-section ($m^2$) and called the impact strength ($kJ/m^2$).

The transmission of light (%) is the ratio between the light transmitted by a specimen and the intensity of the incident light. It was determined as a function of the wavelength over the range from 400 to 900 nm on a test specimen with a thickness of 6 mm.

Transparent plastics whose optical clarity is essential for use are investigated for their cloudiness. Cloudiness or light scatter (%) is the proportion of the light transmitted by a specimen at a direction different from that of the light beam incident on the specimen owing to scattering taking place in the material. The cloudiness was determined on a test specimen with a thickness of 6 mm.

The elongation at break $\epsilon_R$ (%) is determined from the change in length $\Delta L_R$ in mm at the breaking stress and from the original measured length $L_O$ of the specimen in mm using the equation:

$$\epsilon_R = \frac{\Delta L_R}{L_O} \cdot 100$$

The ultimate tensile strength ($N/mm^2$) is the tensile stress at the instant of breakage. The tensile stress is defined as the force relative to the smallest initial cross-section of the specimen at every time during the test.

The tensile strength ($N/mm^2$) is the maximum tensile stress of the test specimen during the tensile test in which an increasing deformation of the specimen is carried out until it breaks in the direction of the long axis.

The softening point (° C.) characterizes the heat resistance of plastics. The Vicat softening point determined by the B/50 method is the temperature at which a steel pin with a circular cross-section of 1 $mm^2$ penetrates 1 mm vertically into the specimen under a force of 49.05N while increasing the temperature at 50 K/h.

The melting characteristics provide qualitative information about the melting of a specimen. For this, it is heated in a test tube under nitrogen to about 280° C. If a molten paste with good flow characteristics at this temperature is formed, it can be concluded that the material has good processing characteristics.

The results of the individual quality tests are shown in Table 7. They show that the emulsion graft copolymers according to the invention are superior in their mechanical, thermal and optical properties to the prior art emulsion polymers.

TABLE 1

5-STAGE EMULSION GRAFT COPOLYMER

| Components (kg) | Initial mixture (1st stage) | Introduction 1 (2nd stage) | Introduction 2 (3rd stage) | Introduction 3 (4th stage) | Introduction 4 (5th stage) |
|---|---|---|---|---|---|
| Deionized water | 120.000 | 45.000 | 18.000 | 80.000 | 37.000 |
| Dioctyl sodium sulfosuccinate | 0.650 | 0.085 | 0.110 | 0.170 | 0.210 |
| Potassium peroxodisulfate | 0.075 | 0.055 | 0.015 | 0.100 | 0.030 |
| 25% strength aqueous ammonia solution | 0.060 | 0.045 | 0.020 | 0.080 | 0.030 |
| MMA | 8.000 | — | 19.500 | — | 39.000 |
| EA | 0.330 | — | 0.930 | — | 1.860 |
| n-BuA | — | 35.370 | — | 70.740 | — |
| Styrene | — | 7.765 | — | 15.525 | — |
| ALMA | 0.026 | 0.885 | 0.025 | 1.770 | — |
| n-Dodecyl mercaptan | — | — | — | — | 0.241 |
| Introduction time at 95° C. (min) | — | 90 | 30 | 105 | 45 |
| Polymerization time at 95° C. (min) | 30 | 45 | 30 | 60 | 15 |

TABLE 2

5-STAGE EMULSION GRAFT COPOLYMER

| Components (kg) | Initial mixture (1st stage) | Introduction 1 (2nd stage) | Introduction 2 (3rd stage) | Introduction 3 (4th stage) | Introduction 4 (5th stage) |
|---|---|---|---|---|---|
| Deionized water | 120.000 | 62.500 | 18.000 | 62.500 | 37.000 |
| Dioctyl sodium sulfosuccinate | 0.650 | 0.130 | 0.110 | 0.130 | 0.210 |
| Potassium peroxodisulfate | 0.075 | 0.080 | 0.015 | 0.080 | 0.030 |
| 25% strength aqueous ammonia solution | 0.060 | 0.060 | 0.020 | 0.060 | 0.030 |
| MMA | 8.000 | — | 19.500 | — | 39.000 |
| EA | 0.330 | — | 0.930 | — | 1.860 |
| n-BuA | — | 53.055 | — | 53.055 | — |
| Styrene | — | 11.645 | — | 11.645 | — |
| ALMA | 0.026 | 1.330 | 0.025 | 1.330 | — |
| n-Dodecyl mercaptan | — | — | — | — | 0.241 |
| Introduction time at 95° C. (min) | — | 95 | 30 | 100 | 45 |
| Polymerization time at 95° C. (min) | 30 | 45 | 30 | 60 | 15 |

TABLE 3

5-STAGE EMULSION GRAFT COPOLYMER

| Components (kg) | Initial mixture (1st stage) | Introduction 1 (2nd stage) | Introduction 2 (3rd stage) | Introduction 3 (4th stage) | Introduction 4 (5th stage) |
|---|---|---|---|---|---|
| Deionized water | 120.000 | 80.000 | 18.000 | 45.000 | 37.000 |
| Dioctyl sodium sulfosuccinate | 0.650 | 0.170 | 0.110 | 0.085 | 0.210 |
| Potassium peroxodisulfate | 0.075 | 0.100 | 0.015 | 0.055 | 0.030 |
| 25% strength aqueous ammonia solution | 0.060 | 0.080 | 0.020 | 0.045 | 0.030 |
| MMA | 8.000 | — | 19.500 | — | 39.000 |
| EA | 0.330 | — | 0.930 | — | 1.860 |
| n-BuA | — | 70.740 | — | 35.370 | — |
| Styrene | — | 15.525 | — | 7.765 | — |
| ALMA | 0.026 | 1.770 | 0.025 | 0.885 | — |
| n-Dodecyl mercaptan | — | — | — | — | 0.241 |
| Introduction time at 95° C. (min) | — | 105 | 30 | 90 | 45 |
| Polymerization time at 95° C. (min) | 30 | 60 | 30 | 45 | 15 |

TABLE 4

3-STAGE EMULSION GRAFT COPOLYMER

| Components (kg) | Initial mixture (1st stage) | Introduction 1 (2nd stage) | Introduction 2 (3rd Stage) |
|---|---|---|---|
| Deionized water | 160.000 | 40.000 | 95.000 |
| Dioctyl sodium sulfosuccinate | 1.010 | 0.400 | 0.490 |
| Potassium peroxodisulfate | 0.100 | 0.040 | 0.040 |
| 25% strength aqueous ammonia solution | 0.080 | 0.030 | 0.030 |
| MMA | 38.750 | — | 67.630 |
| EA | 1.615 | — | 2.830 |
| n-BuA | — | 72.700 | — |
| Styrene | — | 15.950 | — |
| ALMA | 0.040 | 1.820 | — |
| n-Dodecyl mercaptan | — | — | 0.300 |
| Introduction time at 95° C. (min) | — | 90 | 120 |
| Polymerization time at 95° C. (min) | 30 | 120 | 60 |

TABLE 5

5-STAGE EMULSION GRAFT COPOLYMER

| Components (kg) | Initial mixture (1st stage) | Introduction 1 (2nd stage) | Introduction 2 (3rd stage) | Introduction 3 (4th stage) | Introduction 4 (5th stage) |
|---|---|---|---|---|---|
| Deionized water | 2168.00 | 620.00 | 620.00 | 620.00 | 620.00 |
| Dioctyl sodium sulfosuccinate | 47.94 | 1.23 | 3.30 | 1.20 | 3.20 |
| Potassium peroxodisulfate | 5.54 (+1.90)* | 0.74 | 0.74 | 0.68 | 0.74 |
| MMA | 461.80 | — | 453.10 | — | 431.20 |
| α-MeS | 153.70 | — | 151.20 | — | 151.00 |
| EA | — | — | — | — | 30.80 |
| n-BuA | — | 597.50 | — | 597.50 | — |
| Styrene | — | — | — | — | — |
| ALMA | 3.10 | 18.48 | 11.70 | 18.48 | — |
| n-Dodecyl mercaptan | — | — | — | — | 3.08 |
| Introduction time at 95° C. (min) | — | 70 | 105 | 60 | 70 |
| Polymerization time at 80–95° C. (min) | 180 | — | — | — | — |
| Polymerization time at 95° C. (min) | — | 45 | 75 | 70 | 240 |

*Subsequent addition to increase conversion

TABLE 6

5-STAGE EMULSION GRAFT COPOLYMER

| Components (kg) | Initial mixture (1st stage) | Introduction 1 (2nd stage) | Introduction 2 (3rd stage) | Introduction 3 (4th stage) | Introduction 4 (5th stage) |
|---|---|---|---|---|---|
| Deionized water | 1930.00 | 920.00 | 310.00 | 920.00 | 620.00 |
| Dioctyl sodium sulfosuccinate | 23.97 | 1.85 | 0.62 | 1.85 | 3.20 |
| Potassium peroxodisulfate | 2.77 | 1.11 | 0.37 | 1.02 | 0.74 |
| MMA | 246.40 | — | 246.40 | — | 492.80 |
| α-MeS | 61.50 | — | 61.50 | — | 92.40 |
| EA | — | — | — | — | 27.70 |
| n-BuA | — | 822.40 | — | 822.40 | — |
| Styrene | — | 92.40 | — | 92.40 | — |
| ALMA | 0.15 | 9.24 | 0.15 | 9.24 | — |
| n-Dodecyl mercaptan | — | — | — | — | 3.08 |
| Introduction time at 95° C. (min) | — | 100 | 55 | 90 | 75 |
| Polymerization time at 85–95° C. (min) | 80 | — | — | — | — |
| Polymerization time at 95° C. (min) | — | 45 | 105 | 70 | 60 |

TABLE 7

Results of tests on specimens of blends of 39% by weight of emulsion graft copolymer and 61% by weight of a polyacrylate resin composed of 99% by weight of methyl methacrylate and 1% by weight of methyl acrylate

| Properties | Unit | Emulsion graft copolymer from Example | | | | | |
| | | 1 | 2 | 3 | 4 | 5 | 6 |
|---|---|---|---|---|---|---|---|
| Impact strength | kJ/m² | 81 | 70 | 68 | 68 | 26 | 51 |
| Transmission of light | % | 91 | 91 | 91 | 87 | 84 | 77 |
| Cloudiness | % | 2.7 | 2.9 | 2.6 | 4.5 | 8.4 | 15.4 |
| Elongation at break | % | 50 | 45 | 42 | 40 | 10 | 13 |
| Ultimate tensile strength | N/mm² | 35 | 36 | 38 | 36 | 63 | 51 |
| Tensile strength | N/mm² | 40 | 42 | 44 | 42 | 68 | 57 |
| Vicat softening point | °C. | 95 | 94 | 93 | 92 | — | 97 |
| Melting characteristics | — | good | good | very good | good | poor | poor |

We claim:

1. An emulsion graft copolymer composed of
   a) 2–10% by weight of a core composed of
      80–99.99% by weight of methyl methacrylate (I),
      0.01–5% by weight of allyl methacrylate (II),
      0–19.99% by weight of other monofunctional comonomers (III), which are ethylenically unsaturated monomers and
      0–3% by weight of other di- or polyfunctional comonomers (IV) which are ethylenically unsaturated monomers,
   b) 15–50% by weight of a first shell composed of
      60–89.99% by weight of a $C_1$–$C_{20}$-alkyl acrylate (V),
      10–39.99% by weight of a vinylaromatic monomer (VI),
      0.01–5% by weight of II,
      0–10% by weight of I and/or III,
      0–3% by weight of IV,
   c) 5–20% by weight of a second shell with a composition as indicated under (a),
   d) 15–50% by weight of a third shell with a composition as indicated under (b),
   e) 15–30% by weight of a fourth shell composed of
      80–99.95% by weight of I,
      0.05–2% by weight of a regulator (VII) and
      0–19.95% by weight of III,
   with the proviso that the total of the contents of the shells (b) and (d) is 50–75% by weight.

* * * * *